United States Patent
Grabenstetter

(10) Patent No.: US 6,695,336 B1
(45) Date of Patent: Feb. 24, 2004

(54) PONTOON BOAT HAULING APPARATUS AND METHOD

(75) Inventor: Robert Grabenstetter, Toledo, OH (US)

(73) Assignee: Phil Weis, Hudson, MI (US)

(*) Notice: Subject to any disclaimer, the term of this patent is extended or adjusted under 35 U.S.C. 154(b) by 0 days.

(21) Appl. No.: 10/293,045

(22) Filed: Nov. 13, 2002

(51) Int. Cl.$^7$ ................................................. B60P 3/10
(52) U.S. Cl. ................................................. 280/414.2
(58) Field of Search ........................... 280/414.1, 414.2

(56) References Cited

U.S. PATENT DOCUMENTS

| | | | |
|---|---|---|---|
| 1,376,496 A | 3/1921 | Woodruff | 280/80 |
| 1,939,863 A | 12/1933 | Seiter | 280/80 |
| 2,042,598 A | 6/1936 | Harvey | 115/1 |
| 2,540,379 A | 2/1951 | Ridgway, Jr. et al. | 196/52 |
| 2,562,596 A | 7/1951 | Bonfietti | 214/65 |
| 2,622,893 A | 12/1952 | Wasserlein | 280/61 |
| 2,632,655 A | 3/1953 | King et al. | 280/61 |
| 2,909,378 A | 10/1959 | Borchers, Jr. | 280/79.1 |
| 2,967,719 A | 1/1961 | Williams | 280/414 |
| 3,068,024 A | 12/1962 | Berliner | 280/414 |
| 3,195,919 A | 7/1965 | Lossman | 280/124 |
| 3,337,243 A | 8/1967 | Rued | 280/414 |
| 3,445,018 A | 5/1969 | Reagan | 414/462 |
| 3,567,241 A | 3/1971 | Foschino | 280/47 |
| 3,599,256 A | 8/1971 | Carroll, Jr. | 9/1 T |
| 3,689,950 A | 9/1972 | Jalowiecki et al. | 9/1 T |

(List continued on next page.)

*Primary Examiner*—Kevin Hurley
(74) *Attorney, Agent, or Firm*—Gifford, Krass, Groh, Sprinkle, Anderson & Citkowski, PC

(57) ABSTRACT

Apparatus and methods are disclosed for transporting watercraft with pontoons, commonly referred to as "pontoon boats." The apparatus broadly comprises an axle assembly and a hitch assembly. The axle assembly includes beam axle, a pair of wheels mounted for rotation about the beam axle, and a pair of pads or cradles spaced apart at a distance to receive the bottom portions of the pontoons. The hitch assembly is mounted relative to the lower surface of the deck, and includes a hitch bar extending from the front end of the deck which terminates in a cup-shaped receptacle to receive the ball hitch of the tow vehicle. To tow the boat, the cradles are preferably positioned under the craft to receive the bottom portions of the pontoons just rearward of the center of gravity to achieve an acceptable tongue weight on a level surface. The hitch assembly is preferably permanently mounted relative to the lower surface of the deck through welding, mechanical fasteners, or a combination thereof. The apparatus further includes some additional fastener such as a strap associated with each cradle that extends around the outer surface of each pontoon to hold the watercraft in a towing position. To achieve a relatively narrow width during towing, the wheels are preferably mounted for rotation inside the cradles. The spacing of the cradles is also preferably adjustable to suit different watercraft having pontoons with different spacings. The spacing between the wheels may also be adjustable. To ensure transport by vehicles having a hitch ball lower that the bottom surface of the watercraft deck, the hitch bar includes a bend to position the watercraft at level attitude when the ball hitch is received by the receptacle.

16 Claims, 2 Drawing Sheets

U.S. PATENT DOCUMENTS

| | | | |
|---|---|---|---|
| 3,860,982 A | 1/1975 | Rumsey | 9/1 T |
| 3,877,094 A | 4/1975 | Kelley | 9/1 T |
| 3,902,741 A | 9/1975 | Rudder | 280/414 A |
| 4,023,222 A | 5/1977 | Selby | 9/1.2 |
| 4,114,772 A | 9/1978 | Beelow | 214/512 |
| 4,235,450 A | 11/1980 | Conover | 280/47.32 |
| 4,243,239 A | 1/1981 | Whitney | 280/47.13 |
| 4,327,933 A | 5/1982 | Tuggle | 280/414.2 |
| 4,344,635 A | 8/1982 | Welton | 280/414.1 |
| 4,515,102 A | 5/1985 | Kury | 114/344 |
| 4,550,925 A | 11/1985 | McDonough | 280/47.13 |
| 4,554,884 A | 11/1985 | Bouliane | 114/344 |
| 4,637,770 A | 1/1987 | Swadell | 414/495 |
| 4,706,983 A | 11/1987 | Griswold | 280/414.2 |
| RE32,844 E | 1/1989 | Horowitz | 280/641 |
| 4,801,152 A | 1/1989 | Elliott et al. | 280/47.34 |
| 4,801,153 A | 1/1989 | Wilson | 280/414.1 |
| 4,807,894 A | 2/1989 | Walker | 280/63 |
| 5,230,526 A * | 7/1993 | Jolivet | 280/414.2 |
| 5,348,327 A | 9/1994 | Gieske | 280/47.331 |
| 5,433,460 A | 7/1995 | Young | 280/35 |
| 5,547,209 A | 8/1996 | Vanderlinde | 280/414.2 |
| 5,558,034 A | 9/1996 | Hodapp | 114/44 |
| 5,853,185 A | 12/1998 | Marshburn et al. | 280/414.1 |
| 6,067,925 A | 5/2000 | Little | 114/354 |
| 6,439,145 B1 | 8/2002 | Mensch | 114/61.18 |
| 6,446,569 B1 | 9/2002 | Pitts | 114/344 |

* cited by examiner

PONTOON BOAT HAULING APPARATUS AND METHOD

FIELD OF THE INVENTION

This invention relates generally to watercraft hauling apparatus and, in particular, to a lightweight, removable assembly and method for transporting pontoon boats and other vessels of the type having a hull utilizing physically separated pontoons.

BACKGROUND OF THE INVENTION

The use of pontoon boats has steadily increased over the years, as more people develop lake-access property and enjoy the relaxing recreation that such watercraft provide. When it comes to transportation, however, pontoon boats are large and awkward, leading to bulky and expensive trailering requirements. The typical trailer used to transport pontoon boats is very large and heavy, constructed of structural metal members, and typically includes some form of winch mechanism to pull the boat out of the water and onto the trailer. In other words, pontoon boats are currently unloaded and loaded in much the same way as other types of smaller vessels, such as power boats, wherein the trailer is backed partially or entirely into the water, and the boat pulled onto the trailer with the winch.

Since pontoon boats are relatively large and heavy, weighing from 2,000 to 4,000 pounds, or thereabouts, conventional trailers are substantial in construction. If the conventional trailer is owned by the boater, it requires a large storage space when the boat is in the water. When the boat is out of the water, the boat may be left on the trailer, but storage space must be provided for the boat/trailer combination. If the trailer is rented, the boat must be taken off the trailer, blocked up for storage, and placed onto a trailer for loading back into the water for use. Clearly the need remains for a better solution to this problem.

SUMMARY OF THE INVENTION

This invention resides in apparatus for transporting watercraft with pontoons, commonly referred to as "pontoon boats," though the invention is equally applicable to other vessels of the type having a hull utilizing physically separated pontoons. Such watercraft conventionally includes a pair of parallel, spaced-apart pontoons supported under the lower surface of a deck having a front end, each pontoon having an outer surface with a bottom portion.

The apparatus of the invention includes an axle assembly and a hitch assembly adapted for use with a tow vehicle having a ball hitch. The axle assembly includes beam axle, a pair of wheels mounted for rotation about the beam axle, and a pair of upwardly oriented trough-shaped cradles spaced apart at a distance to receive the bottom portions of the pontoons. The hitch assembly is mounted relative to the lower surface of the pontoon boat deck, and includes a hitch bar extending from the front end of the deck which terminates in a cup-shaped receptacle to receive the ball hitch of the tow vehicle.

The hitch assembly is preferably permanently mounted relative to the lower surface of the deck through welding, mechanical fasteners, or a combination thereof. During a towing operation, the cradles are positioned to receive the bottom portions of the pontoons so as to achieve an acceptable tongue weight at the ball hitch of the towing vehicle on a level surface. This ordinarily occurs with the axle assembly positioned slightly rearward of the center of gravity of the pontoon boat. The apparatus further includes some additional feature such as a strap associated with each cradle that extends around the outer surface of each pontoon to hold the watercraft in the desired towing position.

To achieve a relatively narrow width during towing, the wheels are preferably mounted for rotation inside the cradles. The spacing of the cradles is also preferably adjustable to suit different watercraft having pontoons with different spacings. The spacing between the wheels may also be adjustable. To ensure transport by vehicles having a hitch ball lower that the bottom surface of the watercraft deck, the hitch bar includes a bend to position the watercraft at level attitude when the ball hitch is received by the receptacle. To stow the hitch bar when the watercraft is in use in the water, the hitch bar may be removably attachable to the hitch assembly with a locking pin, for example.

A method transporting a watercraft using the invention would include the steps of placing the apparatus in the water such that the cradles are just below the bottom portions of the pontoons due to the buoyancy of the axle assembly. If the inflated tires provide insufficient buoyancy, an auxiliary flotation device or devices may be added according to the invention. The pontoons are then fastened into the cradles and the hitch bar is connected to the towing vehicle, enabling the watercraft to be pulled out of the water. To assist in finding the correct position under the watercraft, the watercraft may be marked or devices may be added to the watercraft to fasten the cradles at the appropriate location.

DETAILED DESCRIPTION OF THE INVENTION

Figure 1:
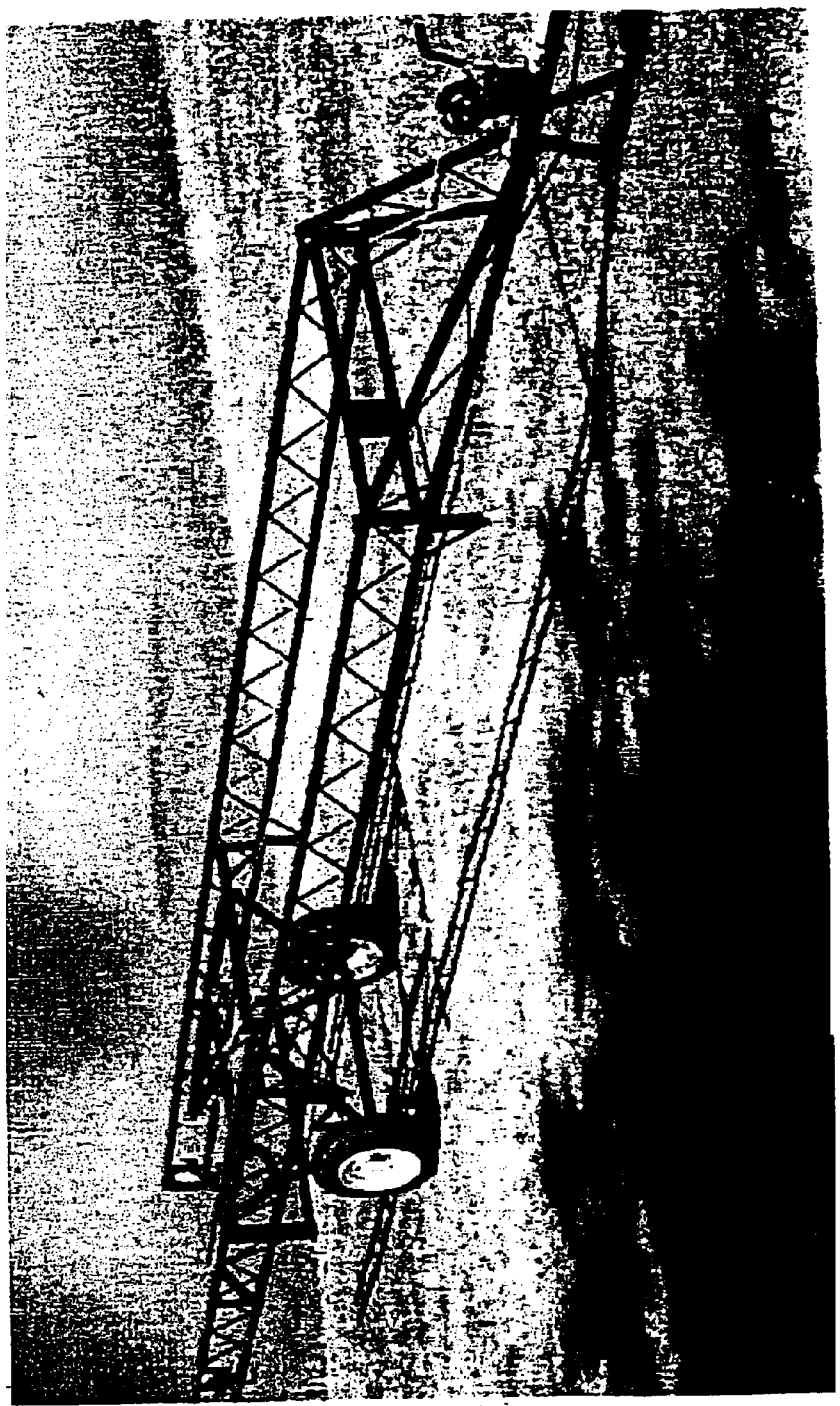
FIG. 1 is an oblique representation of a prior-art pontoon boat trailer of the type currently in use.
Figure 2:
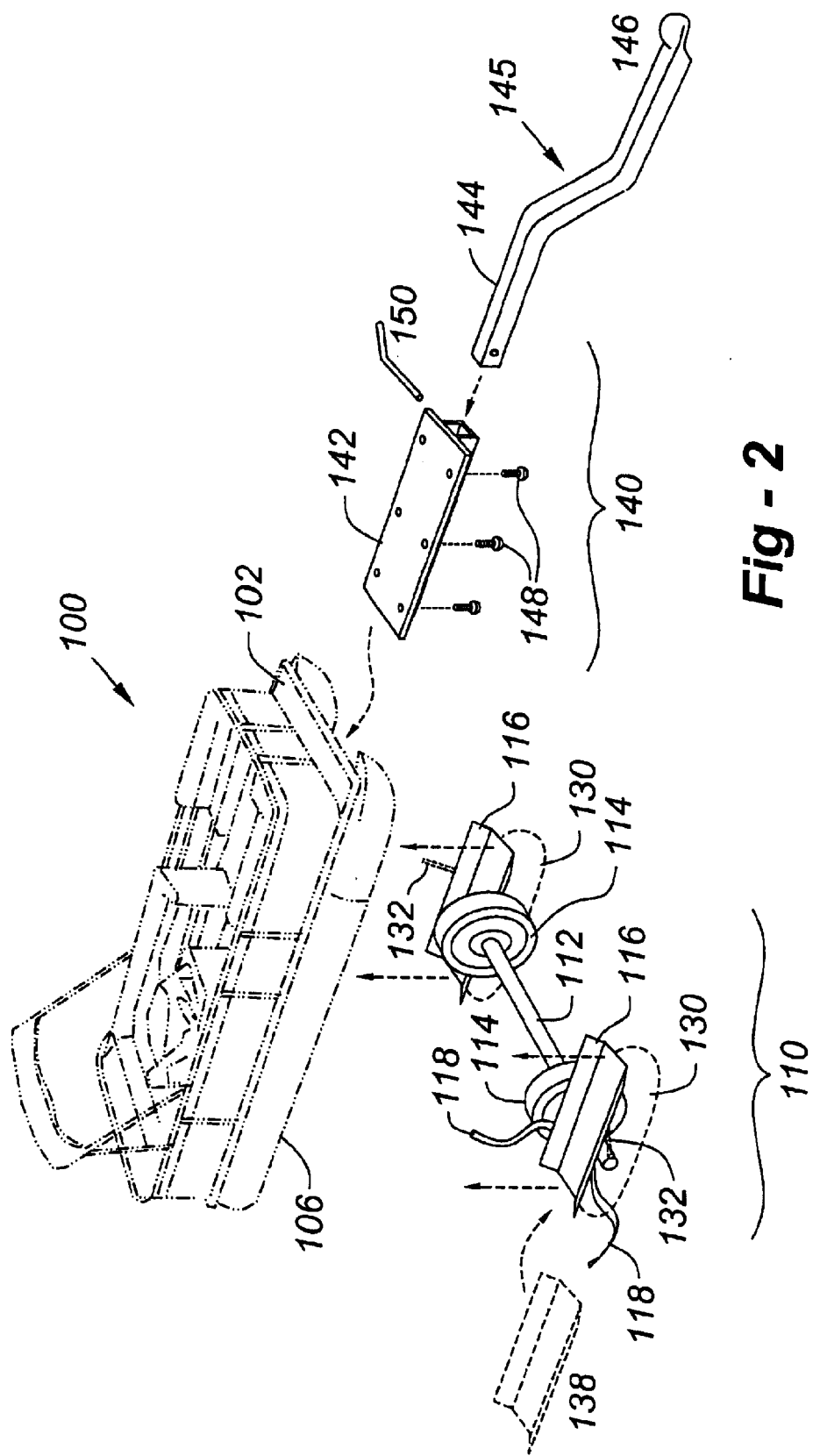
FIG. 2 is an exploded view of apparatus according to the invention.

Reference is now made to the drawings, wherein FIG. 2 illustrates apparatus according to the invention in an exploded-view form. Equipment is adapted for use to transport a pontoon boat, shown generally at 100, which includes a deck 102 underneath which there is supported a pair of elongated, generally parallel spaced-apart pontoons 106. The pontoons 106 include an outer surface, generally circular in cross-section, with a lower portion which is submerged during use in the water.

The apparatus according to the invention includes two-separate assemblies, namely, an axle assembly 110 and a hitch receiver assembly 140. The axle assembly 110 further includes a beam axle 112 upon which there is supported for rotation a set of wheels 114, preferably of the inflated type. The beam axle 112 also supports a pair of spaced-apart cradles 116, which include upwardly oriented troughs, spaced apart at a distance appropriate to receive the bottom portions of the pontoons 106. Conventional pontoons have a diameter on the order of 20 to 25 inches, and are spaced apart on center at a distance of about 6 feet, more or less. Thus, the axle assembly is configured to accept at least this range of dimensions.

In the preferred embodiment, however, the distance between the cradles is adjustable to accommodate different boats and, so is the distance between the wheels 114 to maximize load carrying capability. Also provided in the preferred embodiment are straps 118 or some other type of device used to hold the cradles 116 against the bottom of the pontoons 106 during transport. In addition, as discussed in the Summary of the Invention, one or more flotation devices may be added to achieve a desired level of buoyancy of the axle assembly during positioning under the pontoons. Either non-inflatable or inflatable flotation devices, or a combination thereof, may be used for such purpose. For example, permanent or detachable Styrofoam or other buoyant apparatus may be used, including floating cushions 138 on either cradle. Alternatively, or in combination, one or more inflatable devices such as 130 may be used, preferably with fill/deflation valves 132 that are accessible above water for fine adjustments during positioning under the craft while in the water.

The hitch receiver assembly 140 includes a mounting plate or bracket 142 coupled to a hitch bar assembly 144 terminating proximally in a cup-shape receptacle 146 adapted to engage with the ball hitch of a towing vehicle (not shown). Although the hitch bar may be mounted permanently to the hitch receiver assembly, this may interfere with the use of the boat 100, such that in the preferred embodiment, the hitch bar is removably attachable to the receiver assembly, as through a locking pin 150 or other mechanism.

The hitch receiver assembly 140 is preferably mounted permanently to the underside of the deck 102, using welding and/or mechanical fasteners such as 148, as appropriate to the type of boat onto which the apparatus is being installed. Note, further, that the hitch bar 144 preferably includes a bend 145 enabling the hitch bar to be fastened to the ball hitch with the craft 106 having a substantially level attitude when coupled to the axle assembly 110.

As mentioned, the hitch receiver assembly is preferably permanently fixed to the front and underside of the pontoon boat deck assembly. This may be done either at the time of original manufacture, or as a dealer installed option or, alternatively, as an after-market installed assembly, again, depending upon the complexity of the mounting environment.

To initiate a towing operation, with the watercraft in the water, the axle assembly is placed in the water, and moved around so that the cradles are positioned under the respective pontoons. Preferably, the cradles are positioned so as to achieve an acceptable tongue weight at the ball hitch of the towing vehicle on a level surface. This ordinarily occurs with the axle assembly positioned slightly rearward of the center of gravity of the pontoon boat. Current, acceptable tongue weights are on the order of 200 pounds. With the preferred use of inflatable tires, the axle assembly will be somewhat buoyant in the water; this may be adjusted, however, using the optional flotation device(s) discussed above.

Next the hitch bar assembly is positioned into the hitch receiver, and retained with the locking pin. The entire pontoon boat and axle assembly, through the use of the hitch bar assembly, may then be attached to a tow vehicle and pulled from the water and towed as needed. In summary, the invention utilizes the pontoon boat structure itself is part of the overall trailer, thereby reducing costs substantially compared to existing trailers which must span the entire length of the vessel. In addition, due to the detachment is disassembling qualities of the apparatus, only the axle assembly and hitch bar need be stored during periods of non-use of the watercraft, thereby dramatically reducing storage requirements. Indeed, the axle assembly may also be further disassembled for enhanced compactness when not in use.

I claim:

1. Apparatus for transporting watercraft with a tow vehicle having a ball hitch, the watercraft having a pair of parallel, spaced-apart pontoons supported under the lower surface of a deck with a front end, each pontoon having an outer surface with a bottom portion, the apparatus comprising:

an axle assembly including a beam axle, a pair of wheels mounted for rotation about the beam axle, and a pair of upwardly oriented cradles coupled to the beam axle, the cradles being spaced apart at a distance to receive the bottom portions of the pontoons; and a hitch assembly mounted relative to the lower surface of the deck, the hitch assembly including a hitch bar extending from the front end of the deck and terminating in a cup-shaped receptacle to receive the ball hitch of the tow vehicle.

2. The apparatus of claim 1, wherein the cradles are positioned to receive the bottom portions of the pontoons to achieve an acceptable tongue weight on a level surface.

3. The apparatus of claim 1, wherein the hitch assembly is permanently mounted relative to the lower surface of the deck through welding, mechanical fasteners, or a combination thereof.

4. The apparatus of claim 1, further including a fastener associated with each cradle to hold the watercraft in a towing position.

5. The apparatus of claim 1, wherein the wheels are mounted for rotation inside the cradles.

6. The apparatus of claim 1, wherein the spacing of the cradles is adjustable to suit different watercraft having pontoons with different spacings.

7. The apparatus of claim 1, wherein the spacing between the wheels is adjustable.

8. The apparatus of claim 1, wherein the hitch bar includes a bend to position the watercraft at level attitude when the ball hitch is received by the receptacle.

9. The apparatus of claim 1, wherein the hitch bar is removably attachable to the hitch assembly with a locking pin.

10. Apparatus for transporting watercraft with a tow vehicle having a ball hitch, the watercraft having a center of gravity with a pair of parallel, spaced-apart pontoons supported under the lower surface of a deck with a front end, each pontoon having an outer surface with a bottom portion, the apparatus comprising:

an axle assembly including a beam axle, a pair of wheels mounted for rotation about the beam axle, and a pair of upwardly oriented trough-shaped cradles coupled to the beam axle, the cradles being spaced apart at an adjustable distance to receive the bottom portions of the pontoons slightly behind the watercraft's center of gravity to achieve an acceptable tongue weight on a level surface;

a pair of fasteners to hold each cradle is position against a respective one of the pontoons;

a hitch receiver assembly mounted relative to the lower surface of the deck; and a hitch bar coupled to the hitch receiver assembly, the hitch bar extending from the front end of the deck and including a bend terminating in a cup-shaped receptacle to receive the ball hitch of the tow vehicle with the watercraft at a level attitude.

11. The apparatus of claim 10, wherein the wheels are mounted for rotation inside the cradles.

12. The apparatus of claim 10, wherein the spacing between the wheels is adjustable.

13. The apparatus of claim 10, wherein the hitch bar is removably attachable to the hitch assembly with a locking pin.

14. A method of transporting a watercraft, comprising the steps of:

providing the apparatus of claim 10 with the watercraft floating in water;

placing the apparatus in the water such that the cradles are just below the bottom portions of the pontoons due to the buoyancy of the wheels;

moving the apparatus in the water under the watercraft to a position where the cradles are at least proximate to the center of gravity;

fastening the pontoons to the cradles using the straps;

connecting the hitch bar to the towing vehicle; and pulling the watercraft out of the water.

15. The method of claim 14, further including the step of marking the watercraft at points indicative of the center of gravity to assist with the step of moving the apparatus in the water to a position under the watercraft to achieve an acceptable tongue weight at the towing vehicle.

16. The method of claim 14, further including the step of adjusting the buoyancy of the axle assembly so that the cradles are just below the bottom portions of the pontoons.

* * * * *